(12) United States Patent
Bavarian et al.

(10) Patent No.: US 8,241,374 B2
(45) Date of Patent: Aug. 14, 2012

(54) FLUIDIZED BED SYSTEM FOR SINGLE STEP REFORMING FOR THE PRODUCTION OF HYDROGEN

(75) Inventors: Farshad Bavarian, Houston, TX (US); James F. Stevens, Katy, TX (US); Balaji Krishnamurty, Katy, TX (US); Yunquan Liu, Katy, TX (US); Curtis L. Krause, Houston, TX (US); Lixin You, Sugar Land, TX (US); Daniel G. Casey, Kingwood, TX (US)

(73) Assignee: Texaco Inc., San Ramon, CA (US)

( * ) Notice: Subject to any disclaimer, the term of this patent is extended or adjusted under 35 U.S.C. 154(b) by 871 days.

(21) Appl. No.: 11/611,638

(22) Filed: Dec. 15, 2006

(65) Prior Publication Data

US 2008/0145309 A1 Jun. 19, 2008

(51) Int. Cl.
- *B01J 7/00* (2006.01)
- *C01B 3/36* (2006.01)
- *B01D 59/26* (2006.01)

(52) U.S. Cl. .............. 48/61; 48/197 R; 96/143; 96/146

(58) Field of Classification Search .......... 48/61, 197 R; 96/146
See application file for complete search history.

(56) References Cited

U.S. PATENT DOCUMENTS

| 2,781,248 A * | 2/1957 | Gorin ........................ 423/652 |
| 2005/0112056 A1* | 5/2005 | Hampden-Smith et al. .. 423/651 |
| 2005/0229489 A1 | 10/2005 | Bavarian et al. |
| 2005/0229490 A1 | 10/2005 | Stevens et al. |

OTHER PUBLICATIONS

Balasubramanian, et al.; *Hydrogen from methane in a single-step process*, Chem. Eng. Science 54 (1999) pp. 3543-3552.
Northrop, et al.; *Thermally Integrated Methane Fuel Processor*, Chemical Engineering, University of Michigan, 2700 Hayward, 3074 HH Dow Building, Ann Arbor, MI 481090ur [http://aiche.confex.com/aiche/2005/techprogram/P25926.HTM].

* cited by examiner

*Primary Examiner* — Matthew Merkling
(74) *Attorney, Agent, or Firm* — Melissa Patangia; Christopher D. Northcutt

(57) ABSTRACT

The present invention discloses a fluidized bed system for the single step reforming technology for the production of hydrogen. Single step reforming combines the steam methane reforming, water gas shift, and carbon dioxide removal in a single step process of hydrogen generation. In the present invention, to address the heat transfer and the replenishment issues associated with single step reforming, the sorbent particles are fluidized. This fluidization allows the sorbent particles to be regenerated and consequently allows the optimal operating conditions for single step reforming to be maintained.

14 Claims, 8 Drawing Sheets ized, mixed with steam, and passed over a steam reforming catalyst. The majority of the hydrocarbon feed is converted to a mixture of hydrogen and impurities such as carbon monoxide and carbon dioxide. The reformed product gas is typically fed to at least one water-gas shift bed in which the carbon monoxide is reacted with steam to form carbon dioxide and hydrogen. After the shift reaction(s), additional purification steps are required to bring the reformate purity to acceptable levels. These steps can include, but are not limited to, methanation, selective oxidation reactions, passing the product stream through membrane separators, as well as pressure swing and temperature swing absorption processes. While such purification technologies may be known, the added cost and complexity of integrating them with a fuel reformer to produce sufficiently pure hydrogen reformate can render their construction and operation impractical.

FLUIDIZED BED SYSTEM FOR SINGLE STEP REFORMING FOR THE PRODUCTION OF HYDROGEN

FIELD OF THE INVENTION

The present invention relates generally to a reactor system for the production of hydrogen. The present invention relates specifically to a fluidized bed system for single step reforming for the production of hydrogen.

BACKGROUND OF THE INVENTION

Hydrogen is utilized in a wide variety of industries ranging from aerospace to food production to oil and gas production and refining. Hydrogen is used in these industries as a propellant, an atmosphere, a carrier gas, a diluent gas, a fuel component for combustion reactions, a fuel for fuel cells, as well as a reducing agent in numerous chemical reactions and processes. In addition, hydrogen is being considered as an alternative fuel for power generation because it is renewable, abundant, efficient, and unlike other alternatives, produces zero emissions. While there is wide-spread consumption of hydrogen and great potential for even more, a disadvantage which inhibits further increases in hydrogen consumption is the absence of a hydrogen infrastructure to provide widespread generation, storage and distribution. One way to overcome this difficulty is through distributed generation of hydrogen, such as through the use of fuel reformers to convert a hydrocarbon-based fuel to a hydrogen-rich reformate.

Fuel reforming processes, such as steam reforming, partial oxidation, and autothermal reforming, can be used to convert hydrocarbon fuels such as natural gas, LPG, gasoline, and diesel, into hydrogen-rich reformate at the site where the hydrogen is needed. However, in addition to the desired hydrogen product, fuel reformers typically produce undesirable impurities that reduce the value of the reformate product. For instance, in a conventional steam reforming process, a hydrocarbon feed, such as methane, natural gas, propane, gasoline, naphtha, or diesel, is vapor In terms of power generation, fuel cells typically employ hydrogen as fuel in catalytic oxidation-reduction reactions to produce electricity. As with most industrial applications utilizing hydrogen, the purity of the hydrogen used in fuel cell systems is critical. Specifically, because power generation in fuel cells is proportional to the consumption rate of the reactants, the efficiencies and costs of fuel cells can be improved through the use of highly pure hydrogen reformate. Moreover, the catalysts employed in many types of fuel cells can be deactivated or permanently impaired by exposure to certain impurities that are commonly found in conventionally reformed fuels. As a result, an improved yet simplified reforming apparatus and process capable of providing a high purity hydrogen reformate that is low in carbon oxides is greatly desired.

Single step reforming (SSR) combines steam methane reforming (SMR), water gas shift, and carbon dioxide ($CO_2$) removal in a single step process for hydrogen generation. The SSR reactor includes a reactor vessel having an inlet for receiving a hydrocarbon fuel and an outlet for delivering a hydrogen-rich reformate. Disposed within the reactor vessel is a catalyst bed that includes a reforming catalyst, a carbon dioxide fixing material and a water gas shift catalyst.

Currently, there are various reactor systems for SSR. The most common reactor system includes a fixed bed reactor system resembling a plug flow reactor for the SMR. In this system, a concurrent reaction using calcium oxide (CaO) converts the $CO_2$ generated via SMR to calcium carbonate ($CaCO_3$). This reaction enhances the SMR by creating a thermodynamic shift (enhancement) of the SMR and generates heat to compensate for the SMR endothermic reaction. The combined effect is that in an SSR reactor, there will be a cumulative effect to increase and maintain the SMR reaction at very high rates. In addition, the SSR system yields a very high concentration hydrogen stream.

However, the reaction of CaO with $CO_2$ is a gas to solid reaction whereby the sorbent CaO particles are continuously depleted in the typical plug flow fixed bed reactor. Consequently, shortly after the start of the SMR reaction, the lower sections of the reactor bed are saturated with $CO_2$ and therefore, the enhancement of SSR will diminish as the CaO to $CaCO_3$ saturation front propagates axially across the bed. Eventually, the lower sections of the fixed bed reactor will reduce to a SMR system progressively operating at sub-optimal conditions and lower reaction temperatures.

In addition, the use of combined CaO and SMR catalysts in a fixed bed dictates a semi-batch operation whereby the spent sorbent particles have to be regenerated from $CaCO_3$ to CaO. This process involves heating the sorbent in place by flowing superheated steam and/or exhaust combustion gas at a temperature above 750° C. This cyclical thermal re-processing and semi-batch operation may yield a sub-optimal net thermal energy efficiency of the overall system, may require a larger reactor system, may complicate operations, and may cause thermal degradation of the sorbent particles which cannot be easily accessed for replenishment. The present invention addresses these issues associated with the reactor system for SSR.

SUMMARY OF THE INVENTION

In the present invention, to address the heat transfer and the replenishment issues associated with single step reforming (SSR), the sorbent particles are mobilized. In the present invention, the technique to achieve this result is to fluidize the sorbent particles. This fluidization allows the sorbent particles to be regenerated and consequently allows the optimal operating conditions for SSR to be maintained.

The present invention discloses a fluidized bed system for the SSR technology for the production of hydrogen. SSR combines the steam methane reforming (SMR), water gas shift, and carbon dioxide ($CO_2$) removal in a single step process for hydrogen generation. Therefore, SSR requires effective and optimal integration of the SMR and water gas shift reactions with the $CO_2$ reaction with the sorbent calcium oxide (CaO) particles. The fluidized bed system of the present invention optimizes the balance between the SMR reaction and the $CO_2$ removal reaction. In addition, through the use of the fluidized bed system of the present invention, the thermodynamics of SSR is in balance with the thermal requirements of the purification process.

In one embodiment of the fluidized bed system of the present invention, the SMR catalyst and sorbent particles are in an entrained bed reactor (transport bed). Both the SMR catalyst and sorbent particles are small enough that they can be used in a transport bed phase regime.

In another embodiment of the fluidized bed system of the present invention, the SMR catalyst and sorbent particles are operating in a bubbling or turbulent regime. In this embodiment, the sorbent is either regenerated in a semi-batch regime or may be continuously circulated.

In yet another embodiment of the fluidized bed system of the present invention, the SMR catalyst remains fixed and the sorbent particles are transported through the SMR catalyst bed, into a regenerator, and back to the reactor vessel.

In another embodiment of the fluidized bed system of the present invention, the SMR catalyst and sorbent particles are in a multistage fluidized bed reactor. In this embodiment, the SMR catalyst is fixed or semi-restricted and the sorbent particles are transported or fluidized.

In still another embodiment of the fluidized bed system of the present invention, the sorbent particles are operating in a bubbling regime and are continuously regenerated. In this embodiment, the SMR catalyst may be fixed or may also be operating in a bubbling regime.

Optionally, the fluidized bed system of the present invention can also include a process for using the $CO_2$ stream for sorbent regeneration. By using $CO_2$ for sorbent regeneration, pure $CO_2$ will be generated from the regeneration process for carbon capture and $CO_2$ sequestration.

These and other features and aspects of the present invention will become better understood with reference to the following description, claims, and accompanying drawings. Therefore, the form of the invention, as set out above, should be considered illustrative and not as limiting the scope of the following claims.

BRIEF DESCRIPTION OF THE DRAWINGS

The description is presented with reference to the accompanying drawings in which.

DESCRIPTION OF ILLUSTRATIVE EMBODIMENTS

Figure 1:
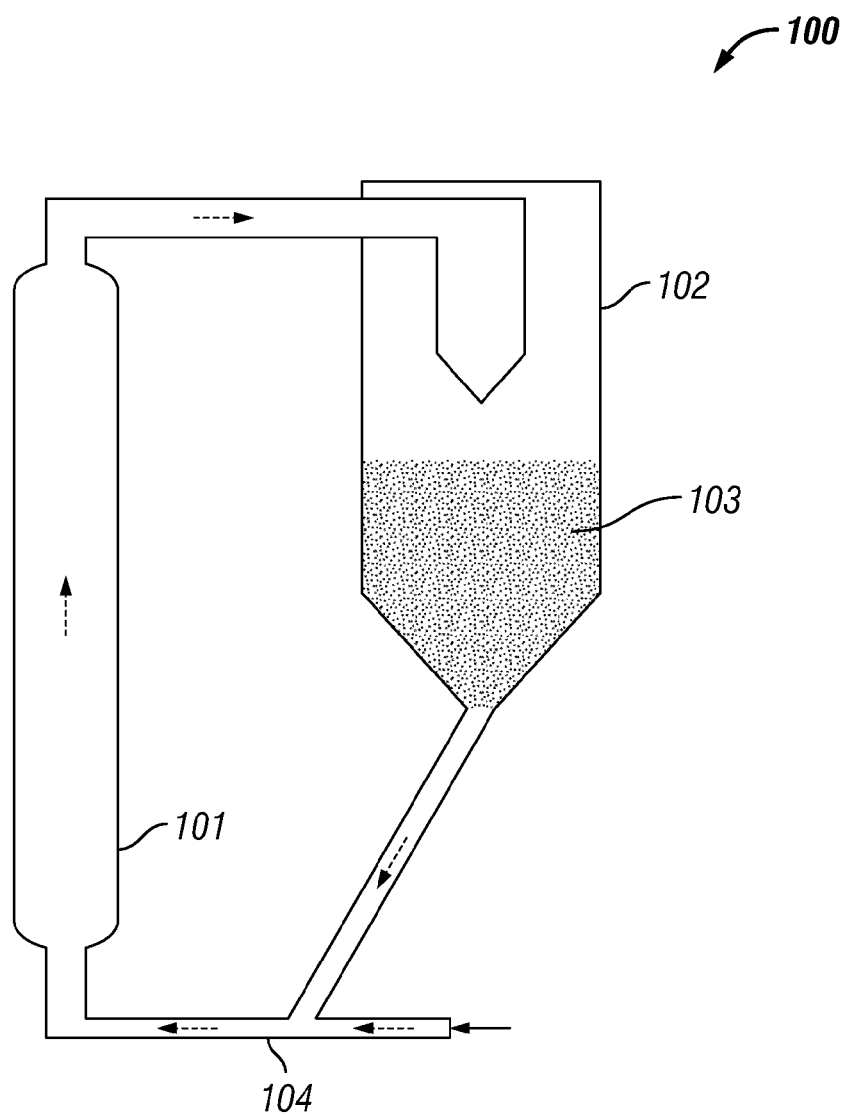
FIG. 1 depicts a simplified cross sectional view of an embodiment of the fluidized bed system of the present invention.

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

The instant invention is generally directed to reactors, apparatuses and methods for converting a hydrocarbon-based fuel to a hydrogen-rich reformate. The invention simplifies the production of a highly pure hydrogen-rich reformate by incorporating a carbon dioxide fixing mechanism into the initial hydrocarbon conversion process. This mechanism utilizes a carbon dioxide fixing material within the reforming catalyst bed that will react with and/or retain carbon dioxide under reaction conditions that are typical for conversion reactions of hydrocarbon to hydrogen and carbon oxides. Hydrocarbon to hydrogen conversion reactions that utilize such carbon dioxide fixing materials are generally referred to as "absorption enhanced reforming" as the absorption or removal of carbon dioxide from the reformed product shifts the reforming reaction equilibrium toward the production of higher levels of hydrogen and lower levels of carbon oxides.

Absorption enhanced reforming generates a hydrogen-rich reformate by conducting multiple reactions within a common catalyst bed. Typical reactions that may be performed within the catalyst bed include fuel reforming reactions such as steam and/or autothermal reforming reactions that generate a reformate containing hydrogen, carbon oxides and potentially other impurities, water gas shift reactions wherein water and carbon monoxide are converted to hydrogen and carbon dioxide, and carbonation reactions wherein carbon dioxide is physically absorbed or chemically converted to preferably a non-gaseous species. Chemical equations for such a combination of reactions using methane ($CH_4$) as the hydrocarbon fuel and calcium oxide (CaO) as the carbon dioxide ($CO_2$) fixing material are as follows:

$$CH_4 + H_2O \rightarrow CO + 3H_2 \qquad \text{SMR Reaction (1)}$$

$$\Delta H = +206 \text{ kJ/mol } CH_4$$

$$CO + H_2O \rightarrow CO_2 + H_2 \qquad \text{Water Gas Shift Reaction (2)}$$

$$\Delta H = -41 \text{ kJ/mol CO}$$

$$CO_2 + CaO \rightarrow CaCO_3 \qquad CO_2 \text{ Reaction (3)}$$

$$\Delta H = -179 \text{ kJ/mol } CO_2$$

$$CH_4 + 2H_2O + CaO \rightarrow 4H_2 + CaCO_3 \qquad \text{Overall Reaction}$$

$$\Delta H = -14 \text{ kJ/mol } CO_2$$

While these equations exemplify the conversion of $CH_4$ to a hydrogen-rich reformate, the scope of the invention should not be so limited.

With respect to the above reactions, reactions 1 and 2 occur on the SMR catalyst while the $CO_2$ reaction occurs on and inside the sorbent CaO particles. While both reactions 1 and 3 are heat transfer limited, reaction 1 is a highly endothermic reaction requiring 206 kJ/mol of $CH_4$ and reaction 3 is a highly exothermic reaction releasing 179 kJ/mol of $CO_2$ absorbed. Overall, the amount of heat released and required in this set of reactions is nearly in balance.

Carbon dioxide fixing materials are typically caused to desorb or evolve carbon dioxide by application of a change in temperature, pressure or a combination of changes in temperature and pressure. For instance, it is known that fixed carbon dioxide can be liberated from many carbon dioxide fixing materials by temporarily elevating the temperature of the fixing material. However, such processes can be highly endothermic depending on the type of fixing material employed, and thus, are often thermally inefficient. Another concern is the risk that the heating of the carbon dioxide fixing material may degrade or otherwise deactivate other components within the catalyst bed, namely, the reforming catalyst. Moreover, care should be taken to assure that such processes do not result in the deposition of materials within the catalyst bed that can inhibit the activity of the catalyst(s) or other bed components.

The reforming catalyst(s) may be in any form including pellets, spheres, extrudates, monoliths, as well as common particulates and agglomerates. Conventional steam reforming catalysts are well known in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium. Where the reforming reaction is preferably a steam reforming reaction, the reforming catalyst preferably comprises rhodium on an alumina support.

A reactor of the instant invention for producing hydrogen comprises a reactor vessel having an inlet for receiving a hydrocarbon fuel and an outlet for delivering a hydrogen-rich reformate. The inlet of the reactor vessel is preferably connected to sources of hydrocarbon fuel and steam. Optionally, where a hydrocarbon fuel to be utilized in the reactor vessel comprises sulfur-containing compounds, a desulfurization unit can be connected to the vessel to reduce the sulfur content of the fuel. A source of air, oxygen, or oxygen-enriched air can be connected to the reactor vessel, such as where the intended reforming reaction is an autothermal reforming reaction. Separate inlets for hydrocarbon fuel(s), steam, and/or air may be utilized, or in an alternative, two or more of such materials may be combined and mixed outside the reactor vessel and introduced as a mixture through a common inlet. Heated mixtures of hydrocarbon fuel and oxidants should be avoided so as to an undesired oxidation of the materials.

Specifically, the present invention discloses a fluidized bed system for the single step reforming (SSR) technology for the production of hydrogen. As described herein, SSR combines the steam methane reforming (SMR), water gas shift, and $CO_2$ removal in a single step process for hydrogen generation. The reactor vessel includes a catalyst bed disposed within the vessel that comprises an SMR catalyst, a water gas shift catalyst, and a $CO_2$ fixing material.

The optimal operation of SSR requires having the heat releasing particles of CaO near and in the vicinity of the SMR catalyst. In addition, the optimal operation of SSR also requires supplying enough $CO_2$ to the sorbent particles to maintain a suitable sequential reaction. As the reactions progress, the sorbent CaO particles are gradually converted to calcium carbonate ($CaCO_3$). The $CaO/CaCO_3$ boundary line essentially follows a shrinking core system which may eventually result in a slower reaction due to the increasing thermal conduction pathway and consequently lower utilization rate of the sorbent particles.

In addition, for the optimal operation of SSR, it is important to have the kinetic rates of reactions 1 and 2 and reaction 3 to be nearly the same. Further, for the optimal operation of SSR, there must be the ability to replenish the sorbent particles which is consumed at the SMR catalyst sites. Moreover, for the optimal operation of SSR, the heat transfer resistance between the sorbent particles and SMR catalyst should be minimized.

The inter-dependency of the reactions requires a mobile and continually replenishing supply of sorbent particles, such as CaO. The mobility of CaO is critical as it converts to $CaCO_3$. This requires that the $CaCO_3$ particles be regenerated and re-circulated through the reactor.

In the present invention, to optimize the operation of SSR, the sorbent particles are mobilized by fluidization. This fluidization allows the sorbent particles to be regenerated and consequently allows the optimal operating conditions for SSR to be maintained. Further, this fluidization and regeneration allows the fluidized bed systems to be operated continuously. This fluidization and regeneration of the sorbent particles is demonstrated in the following embodiments of the fluidized bed system of the present invention.

With reference to FIG. 1, FIG. 1 illustrates an embodiment of the fluidized bed system 100 of the present invention. The fluidized bed system 100 includes a reactor vessel 101, a cyclone 102, and a regenerator 103. In this embodiment, the reactor vessel 101 is an entrained bed reactor (transport bed). Both the SMR catalyst and sorbent particles are entrained. Both SMR catalyst and sorbent particles are small enough that they can be used in a transport bed phase regime. The spent SMR catalyst and sorbent particles exit the top of the reactor vessel 101 via cyclone 102. The spent SMR catalyst and sorbent particles are then regenerated in a bubble bed regenerator 103. Following regeneration, the regenerated SMR catalyst and sorbent particles are transported back into the reactor vessel 101 with the $CH_4$+steam reaction stream at inlet 104. While the SMR catalyst does not have to be regenerated, in this embodiment, both the SMR catalyst and sorbent particles go to the high temperature zone used for regeneration. The sensible heat transported by the powder heats up the gas stream to the reaction temperature. The rest of the reaction cycle is in balance. The bulk ratio of the sorbent particles to SMR catalyst and degree of regeneration and sorbent utilization determines the solid circulation. Please note that the flow of hydrocarbon fuel to hydrogen rich reformate is not depicted in this illustration.

Figure 1A:
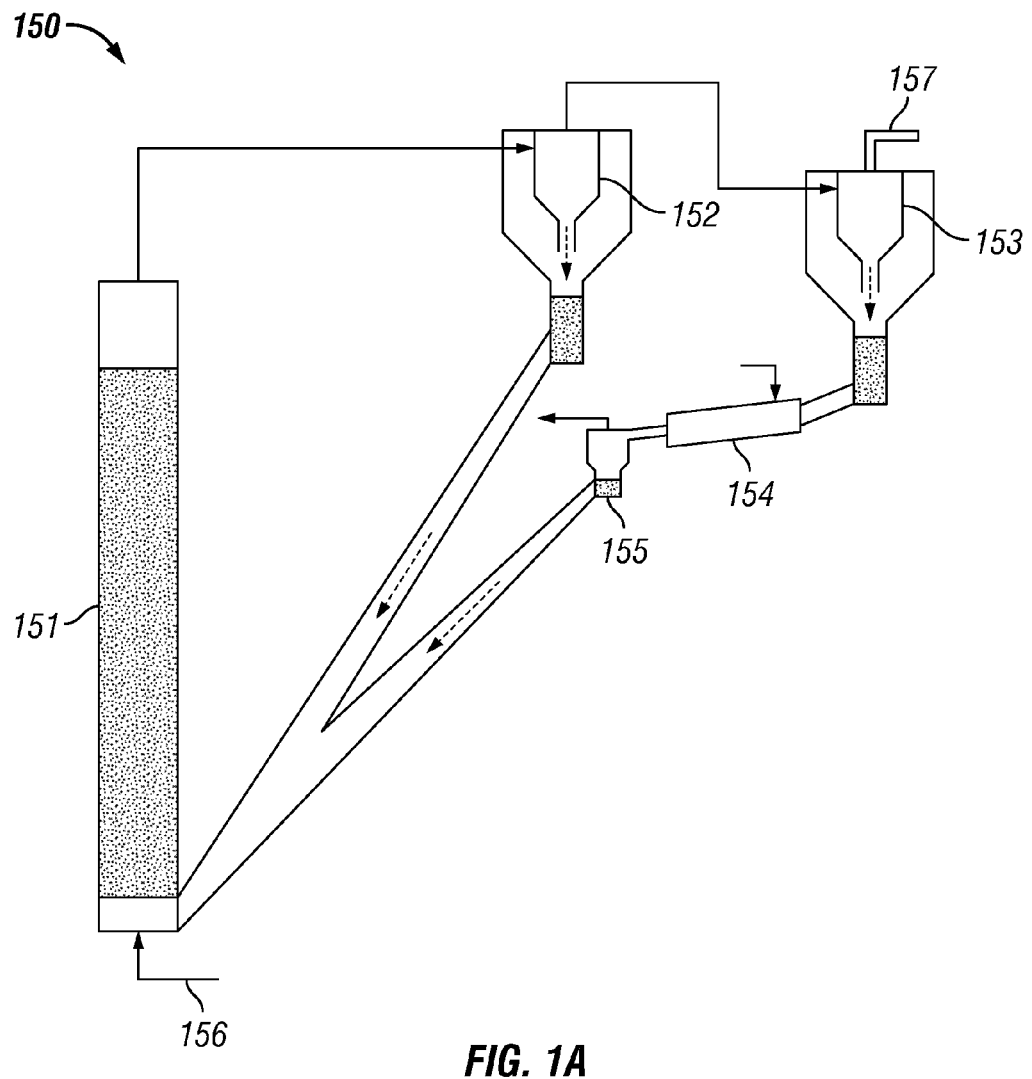
FIG. 1A depicts a simplified cross sectional view of an embodiment of the fluidized bed system of the present invention.

With reference to FIG. 1A, FIG. 1A illustrates a variation of the embodiment illustrated in FIG. 1. In this variation, the SMR catalyst and the sorbent particles are separated for regeneration. This embodiment of the fluidized bed system 150 of the present invention includes a reactor vessel 151, a first cyclone 152, a second cyclone 153, a rotary calciner 154, and a hopper 155. Like the embodiment depicted in FIG. 1, in this embodiment, the reactor vessel 151 is an entrained bed reactor (transport bed). Both the SMR catalyst and sorbent particles are entrained. Both SMR catalyst and sorbent particles are small enough that they can be used in a transport bed phase regime. The spent SMR catalyst and sorbent particles exit the top of the reactor vessel 151. However, upon exiting the reactor vessel 151, the spent SMR catalyst is separated from the spent sorbent particles (and reformate) at the first cyclone 152. This separation can be achieved by selecting an SMR catalyst of appropriate size relative to the size of the sorbent particles. This separation allows non-precious metal SMR catalyst to be used and prevents its exposure to high temperatures. The separated SMR catalyst is then transported back into the reactor vessel 151 with the $CH_4$+steam reaction stream at inlet 156. The sorbent particles further separate from the reformate at the second cyclone 153. The separated sorbent particles are then regenerated in a rotary calciner 154 which provides indirect heat for regeneration. Next, a hopper 155 separates the regenerated sorbent particles from $CO_2$ and steam. Finally, the regenerated sorbent particles are transported back into the reactor vessel 151 with the $CH_4$+steam reaction stream and regenerated SMR catalyst at inlet 156. The hydrogen rich reformate will exit via the reformate outlet 157.

Figure 2:
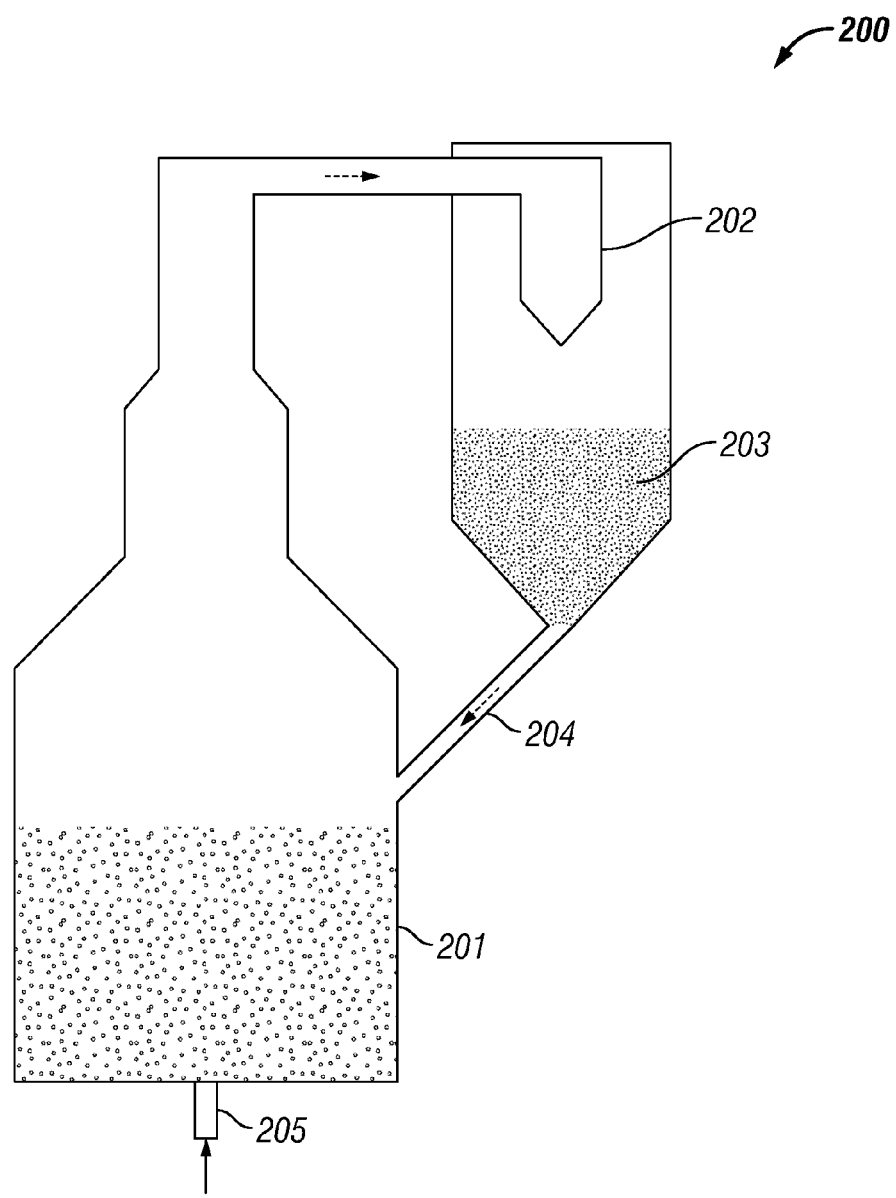
FIG. 2 depicts a simplified cross sectional view of an embodiment of the fluidized bed system of the present invention.

With reference to FIG. 2, FIG. 2 illustrates another embodiment of the fluidized bed system 200 of the present invention. The fluid bed system 200 includes a reactor vessel 201, a cyclone 202, a regenerator 203, a regeneration inlet 204, and a steam+$CH_4$ inlet 205. Please note that the flow of hydrocarbon fuel to hydrogen rich reformate is not depicted in this illustration. In this embodiment, the reactor vessel 201 is a bubbling bed reactor. By properly selecting the size ratio of the SMR catalyst versus the sorbent particles, there are two basic modes of operation for this embodiment.

With reference to FIG. 2, in the first mode of operation, the sorbent particles are regenerated via a semi-batch system. In this mode, the sorbent particles are transported selectively out of the reactor vessel 201 via cyclone 202, regenerated at regenerator 203, and reloaded back into the reactor vessel 201 at regeneration inlet 204. In this mode, the SMR catalyst is fixed.

With reference to FIG. 2, in the second mode of operation, the sorbent particles are continuously circulated inside the SMR catalyst bed inside the reactor vessel 201. In this second mode of operation, the SMR catalyst can be either fixed or fluidized depending on the SMR catalyst size and size distribution. The sorbent particles are circulated by maintaining a smaller size and proper pressure balance across the system. In this second mode of operation the sorbent particles and, if fluidized, the SMR catalyst, exit the reactor vessel 201 via cyclone 202, are regenerated at regenerator 203, and are reloaded back into the reactor 201 at regeneration inlet 204.

Figure 3:
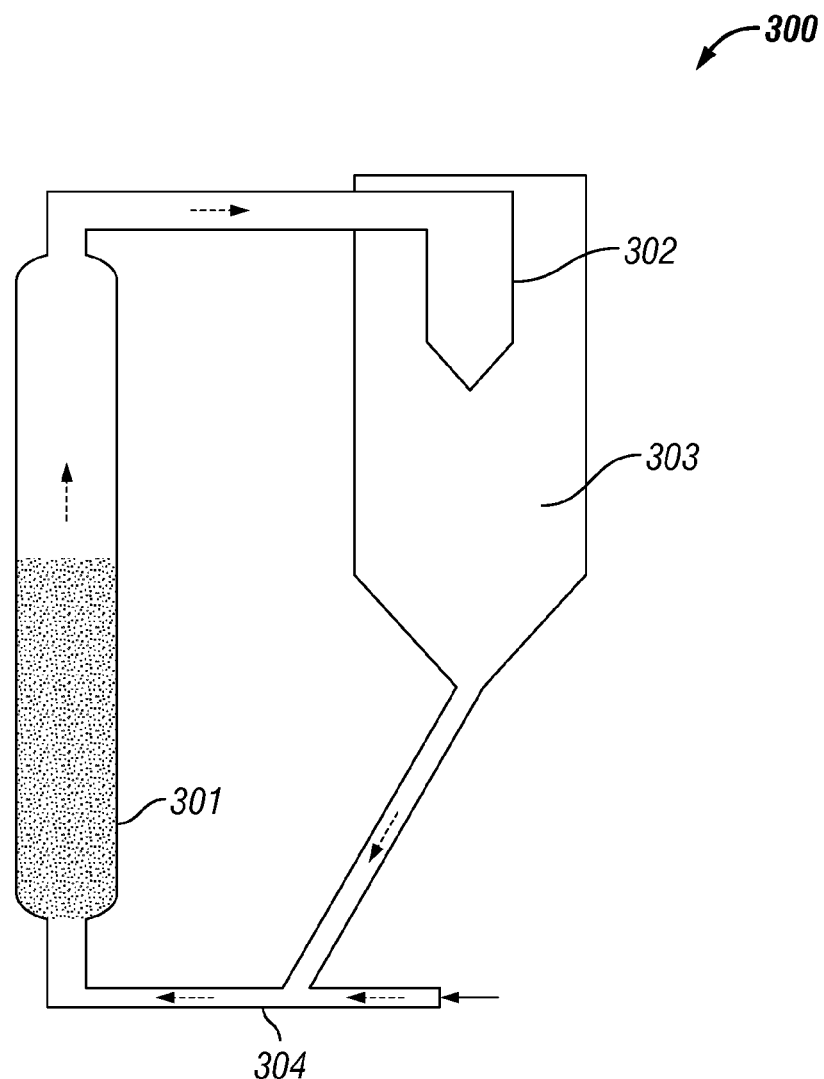
FIG. 3 depicts a simplified cross sectional view of an embodiment of the fluidized bed system of the present invention.

With reference to FIG. 3, FIG. 3 illustrates another embodiment of the fluidized bed system 300 of the present invention. The fluidized bed system 300 includes a reactor vessel 301, a cyclone 302, regenerator 303, and an inlet 304. In this embodiment, the SMR catalyst is immobilized inside the reactor vessel 301 and the sorbent particles are transported through the SMR catalyst. The sorbent particles exit the reactor vessel 301 via cyclone 302 and enter the regenerator 303. Following the regeneration, the sorbent particles return to the reactor 301 with steam+$CH_4$ at inlet 304. Please note that the flow of hydrocarbon fuel to hydrogen rich reformate is not depicted in this illustration.

Figure 3A:
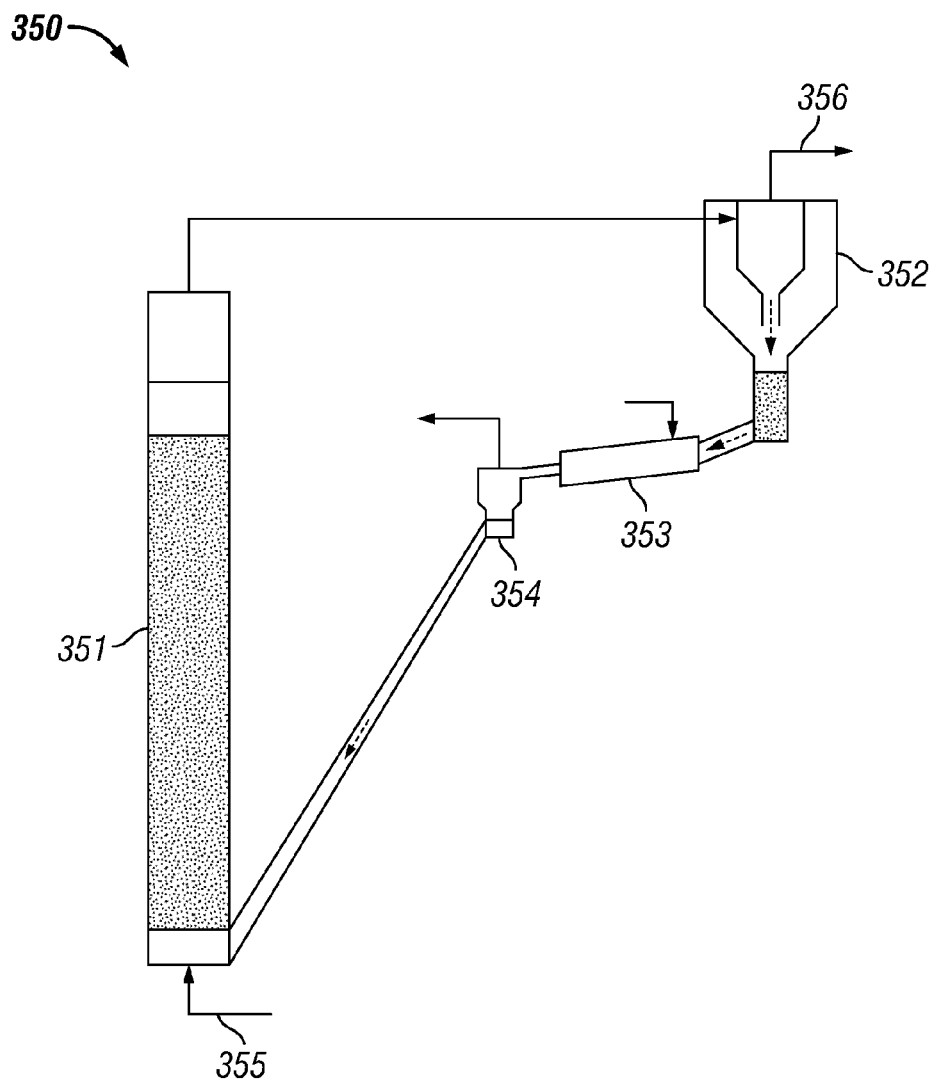
FIG. 3A depicts a simplified cross sectional view of an embodiment of the fluidized bed system of the present invention.

With reference to FIG. 3A, FIG. 3A illustrates a variation of the embodiment illustrated in FIG. 3. In this variation, the sorbent particles are regenerated using indirect heat in the rotary calciner 353. In this variation, the fluidized bed system 350 includes a reactor vessel 351, a cyclone 352, a rotary calciner 353, a hopper 354, an inlet 355, and a reformate outlet 356. In this embodiment, the SMR catalyst is immobilized inside the reactor vessel 351. The sorbent particles exit the reactor vessel 351 via cyclone 352. The sorbent particles are regenerated using indirect heat in the calciner 353. Next, a hopper 354 separates the regenerated sorbent particles from $CO_2$ and steam. Finally, the sorbent particles return to the reactor 351 with steam+$CH_4$ at inlet 355. The hydrogen rich reformate will exit via the reformate outlet 356.

Figure 4:
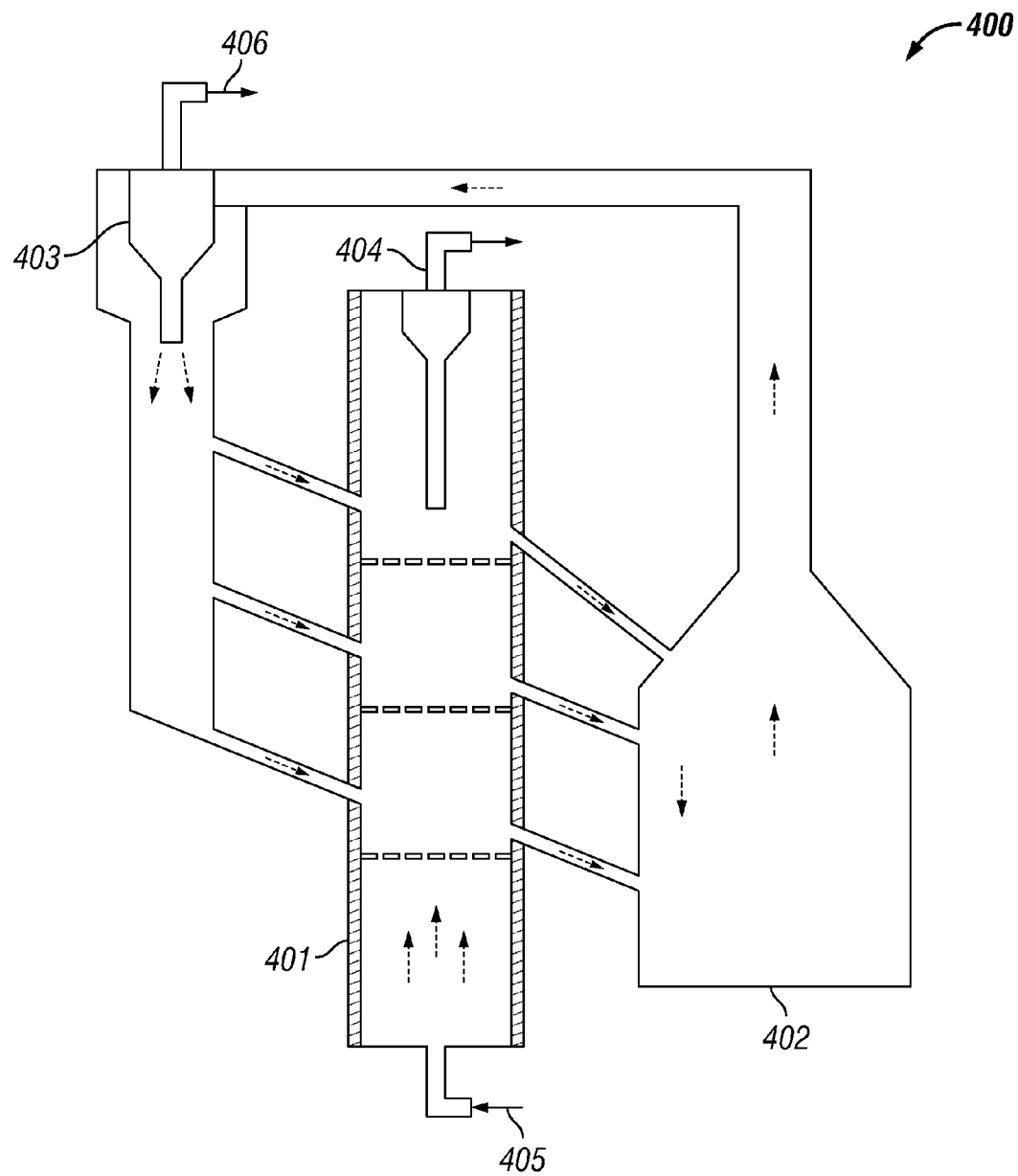
FIG. 4 depicts a simplified cross sectional view of an embodiment of the fluidized bed system of the present invention.

With reference to FIG. 4, FIG. 4 illustrates another embodiment of the fluidized bed system 400 of the present invention. In this embodiment, fluidized bed system 400 is a multistage fluidized bed. The fluidized bed system includes a reactor vessel 401, a regenerator 402, a cyclone 403, a product outlet 404, a steam+$CH_4$ inlet 405, and an exhaust gas outlet 406. In this embodiment, the SMR catalyst is fixed or semi-restricted in the reactor vessel 401 and the sorbent particles are fluidized. In this embodiment, the sorbent particles are continuously withdrawn from the bottom of the reactor vessel 401 and sent to the regenerator 402. Following regeneration, the sorbent particles are recirculated back to the reactor vessel 401 via a cyclone 403. This embodiment has the added advantage of maintaining optimal reaction conditions with varying kinetics between the SMR and sorbent reactions. Please note that the flow of hydrocarbon fuel to hydrogen rich reformate is not depicted in this illustration; however, the product will exit via the product outlet 404.

Figure 5:
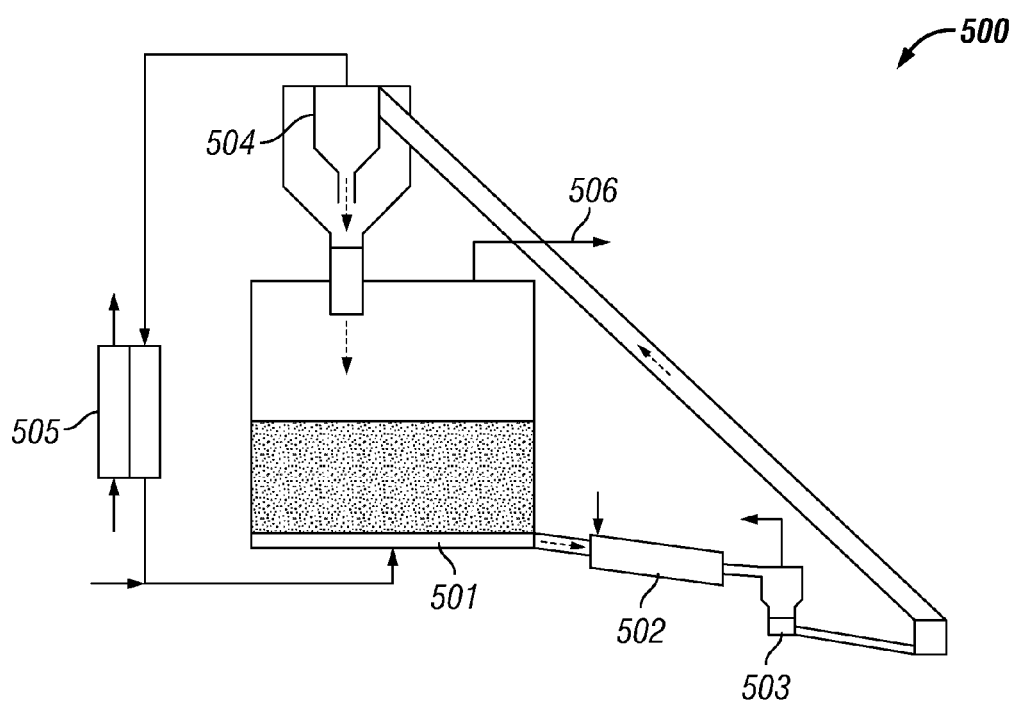
FIG. 5 depicts a simplified cross sectional view of an embodiment of the fluidized bed system of the present invention.

With reference to FIG. 5, FIG. 5 illustrates an embodiment of the fluidized bed system 500 of the present invention. The fluidized bed system 500 is a bubbling or turbulent fluidized bed with continuous regeneration. The fluidized bed system 500 includes a reactor vessel 501, a rotary calciner 502, a hopper 503, a cyclone 504, a heat exchanger 505, and a product outlet 506. In this embodiment, the SMR catalyst is either fixed or operates in a bubbling regime. The sorbent particles operate in a bubbling regime. The spent sorbent particles are continuously drawn from the bottom of the reactor vessel 501 and sent to the rotary calciner 502 to be regenerated. The difference in density between the spent sorbent particles and the fresh sorbent particles will cause the spent sorbent particles to move towards the bottom of the reactor vessel 501. The rotary calciner 502 provides indirect heat for the regeneration of the spent sorbent particles. The temperature for regeneration can be controlled so that it will be high enough to eliminate the need for a sweep gas. However, a small amount of steam is used to keep any air from entering the system loop. The regenerated sorbent particles exiting the rotary calciner 502 can be separated from $CO_2$ and steam using a hopper 503. The regenerated sorbent particles are then entrained in steam to the top of the reactor vessel 501. With this steam step, the sorbent particles can be cooled to the appropriate feed temperature and the excess heat can be recovered using a low temperature steam. In addition, with this steam step, the steam can treat the sorbent particles to improve material performance by using an appropriate inlet steam temperature and flowrate. At the top of the reactor vessel 501, the cyclone 504 separates the sorbent particles from steam. The sorbent particles are then fed back into the reactor vessel 501. The steam is then superheated via a heat exchanger 505, mixed with natural gas, and fed to the bottom of the reactor vessel 501. Please note that the flow of hydrocarbon fuel to hydrogen rich reformate is not depicted in this illustration; however, the product will be drawn from the top of the reactor via the product outlet 506.

As an additional aspect of the embodiments of the present invention, pure $CO_2$ can be generated from the regeneration process for the purpose of carbon capture and/or $CO_2$ sequestration via a fluidized sorbent regeneration. Regeneration is a strong endothermic reaction, thus a heat supply is required. Also, to keep the driving force for mass transfer, the released $CO_2$ from regeneration has to be carried away continuously. In this aspect, a pure $CO_2$ stream, instead of steam or air combusted flue gas, is used for regenerating the sorbent particles. The reason for choosing a pure $CO_2$ stream as the heat source and as the carrier gas for sorbent regeneration is because pure $CO_2$ can be generated after the regeneration. Although using steam for regeneration can achieve the same role—obtaining pure $CO_2$, it tends to be very hard to recover the latent heat from the exhausted steam after regeneration thus resulting in lower thermal efficiency for the system. Another approach that could be used for sorbent regeneration is using air combusted flue gas however, pure $CO_2$ cannot be obtained after regeneration this way due to nitrogen in the air. Moreover, the formed nitrogen oxides ($NO_x$) can cause extra pollution issues.

After sorbent (CaO) is saturated, regeneration is required as shown in the following reaction:

$$CaCO_3 \rightarrow CO_2 + CaO \qquad \text{Regeneration Reaction (4)}$$

$\Delta H = +179$ kJ/mol $CO_2$

Figure 6:
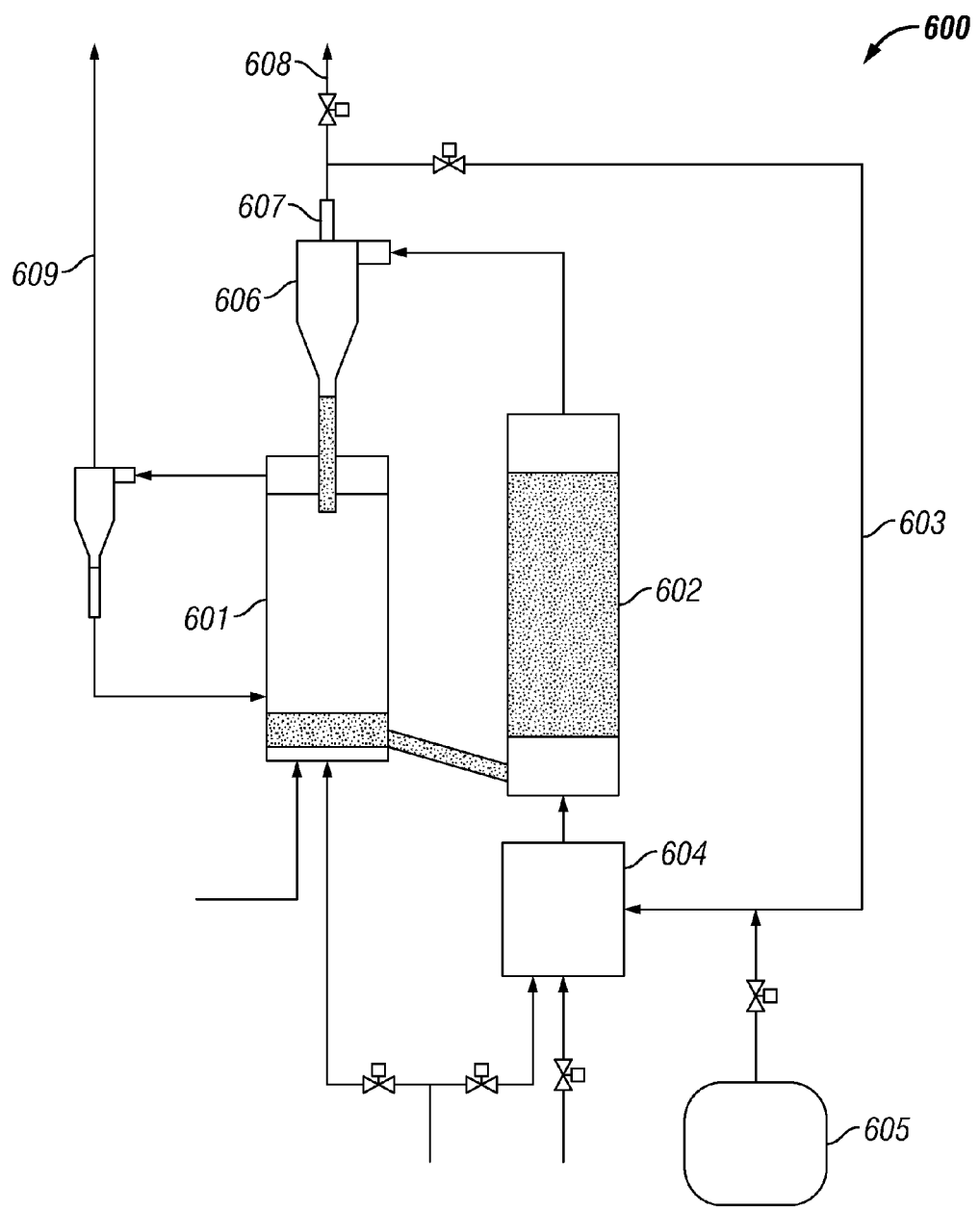
FIG. 6 depicts a schematic of an embodiment of the fluidized bed system of the present invention with the $CO_2$ stream being for sorbent regeneration.

With reference to FIG. 6, FIG. 6 illustrates one of the embodiments of the fluidized bed system 600 of the present invention with the $CO_2$ stream being used for sorbent regeneration. The fluidized bed system 600 includes a reactor vessel 601, a regeneration bed 602, $CO_2$ piping 603, an oxygen burner 604, start-up tank 605, cyclone 606, cyclone outlet 607, $CO_2$ storage or sequestration 608, and product outlet 609. The spent sorbent particles exit the reactor vessel 601 and enter the regeneration bed 602. $CO_2$ is added to the regeneration bed 602 via the $CO_2$ piping 603 and oxygen burner 604. Fresh sorbent particles exit the regeneration bed 602 and enter the reactor vessel 601 via cyclone 606. Pure $CO_2$ is separated from the fresh sorbent particles exiting the regeneration bed 602 at cyclone 606. The pure $CO_2$ from the cyclone outlet 607 is either recycled back to the oxygen burner 604 via the $CO_2$ piping 603 or is sent to $CO_2$ storage or sequestration 608. Please note that the flow of hydrocarbon fuel to hydrogen rich reformate is not depicted in this illustration; however, the product will exit via the product outlet 609.

In detail, inside the reactor vessel 601, the sorbent particles are in bigger particles which rain down from the top of the reactor vessel 601 and collect at the bottom and then slide into the regeneration bed 602 for regeneration. In contrast, the SMR catalyst is in smaller particles and enters the reactor vessel 601 from the bottom and moves upward. The sorbent particles and the SMR catalyst are in counter-current flow and both are fluidized inside the reactor vessel 601.

For the fluidized sorbent regeneration process of the present invention, the $CO_2$ stream from the reactor vessel 601 is first fed, via $CO_2$ piping 603, into an oxygen burner 604, where natural gas is combusted with pure oxygen. The oxygen instead of air is required to get rid of the contamination from nitrogen or nitrogen oxides in the combustion flue gas. To minimize the fuel consumption and enhance the thermal efficiency, the pure $CO_2$ stream is added to the oxygen burner 604 (which is designed to burn as small amount of natural gas as possible) to dilute the flame to the desired temperature (for example, approximately 920° C.) for regeneration applications.

To make the process work, a start-up tank 605 containing pure $CO_2$ is required. Start-up tank 605 helps minimize the consumption of natural gas and pure oxygen at initial start-up. Start-up tank 605 can be refilled later with the pure $CO_2$ generated from the SSR process. As a result, the net consumption of $CO_2$ in the start-up tank is zero. Once the regeneration starts, the generated pure $CO_2$ is recycled back to the oxygen burner. This $CO_2$ stream is preheated by the oxygen burner 604 while cooling and diluting the flame. Due to the direct heat transfer between the hot flue gas (oxygen combusted flue gas) and $CO_2$ inside the oxygen burner 604, the heat exchange efficiency for $CO_2$ heating up is higher, which eliminates the large gas-gas indirect heat exchanger that might be required otherwise.

The $CO_2$ stream coming out of the oxygen burner 604 (used for regeneration) is not 100% of $CO_2$. It could have minor amount of water vapor formed by the following natural gas full combustion reaction:

$$CH_4 + 2O_2 \rightarrow CO_2 + 2H_2O(g) \qquad \text{NG Full Combustion (5)}$$

$\Delta H = -803$ kJ/mol $CH_4$

Because pure oxygen is used to combust the natural gas ($CH_4$) instead of air, the stream coming out of the oxygen burner 604 is free of nitrogen or nitrogen oxides, which makes the production of pure $CO_2$ from the regeneration process possible.

The regenerator bed 602 is a fluidized bed. In this fluidized bed, the heat required for endothermic sorbent regeneration (de-carbonation) is supplied by the $CO_2$ stream. The required flowrate of $CO_2$ is determined by the heat required for regeneration. To make the regeneration fast and complete, the inlet temperature of the $CO_2$ stream entering the regeneration bed needs to be approximately 920° C. This high temperature is needed to make the $CO_2$ equilibrium partial pressure much larger than its actual partial pressure. It is this difference that makes the regeneration possible. In regeneration, due to its endothermic nature, the exhaust coming out of the regeneration bed 602 will have a lower temperature, for example approximately 850° C. As a result, the recycled $CO_2$ needs to be preheated again before it can be used for the next regeneration. However, as the recycled $CO_2$ is still hot (for example, approximately 800° C.), less fuel will be required for $CO_2$ preheating.

While FIG. 6 depicts the use of the $CO_2$ stream process with one embodiment of the fluidized bed system of the present invention, it should be understood that the $CO_2$ stream process of the present invention may be used with any of the embodiments of the fluidized bed system of the present invention.

While this invention has been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A fluidized bed system for producing a hydrogen rich reformate comprising:
    a reactor vessel having a sorbent outlet and sorbent inlet;
    a steam methane reforming catalyst disposed within said reactor vessel;
    a water gas shift catalyst disposed within said reactor vessel;
    sorbent particles for carbon dioxide removal disposed within said reactor vessel;
    a regenerator in fluid communication with the reactor vessel, which receives a fluid with sorbent particles for regeneration that is substantially free of the steam methane reforming catalyst; and
    at least one cyclone in fluid communication with the sorbent outlet of the reactor vessel and sorbent inlet of the reactor vessel, the at least one cyclone comprise a cyclone positioned between the sorbent outlet of the reactor vessel and the regenerator to separate the steam methane reforming catalyst from the sorbent particles before the sorbent particles enter the regenerator.

2. The fluidized bed system of claim 1, wherein at least one cyclone is positioned between the reactor vessel and the regenerator to separate the steam methane reforming catalyst and the sorbent particles.

3. The fluidized bed system of claim 1, wherein said reactor vessel is an entrained bed reactor; wherein said steam methane reforming catalyst is entrained; wherein said sorbent particles are entrained; wherein said at least one cyclone is one cyclone; and wherein said regenerator is a bubble bed regenerator.

4. The fluidized bed system of claim 1, wherein said reactor vessel is a bubbling bed reactor; wherein said sorbent particles are fluidized; and wherein said at least one cyclone is one cyclone.

5. The fluidized bed system of claim 4, wherein said steam methane reforming catalyst is fluidized.

6. The fluidized bed system of claim 1, wherein said fluidized bed system is a multistage fluidized bed; wherein said sorbent particles are fluidized; and wherein said at least one cyclone is one cyclone.

7. The fluidized bed system of claim 1, the regenerator comprises a rotary calciner for providing indirect, heat for regeneration and a hopper for separating carbon dioxide and steam.

8. The fluidized bed system of claim 7, wherein said reactor vessel is an entrained bed reactor; wherein said steam methane reforming catalyst is entrained; wherein said sorbent particles are entrained; and wherein said at least one cyclone is two cyclones.

9. The fluidized bed system of claim 7, further comprising a heat exchanger.

10. The fluidized system of claim 9, wherein said sorbent particles operate in a bubbling regime; and wherein said at least one cyclone is one cyclone.

11. The fluidized bed system of claim 10, wherein said steam methane reforming catalyst operates in a bubbling regime.

12. The fluidized bed system of claim 1, further comprising:
an oxygen burner; and
a carbon dioxide start-up tank.

13. The fluidized bed system of claim 12, further comprising carbon dioxide storage.

14. The fluidized bed system of claim 12, further comprising carbon dioxide sequestration.

* * * * *